United States Patent [19]
Dreisbach, Jr. et al.

[11] 4,354,345
[45] Oct. 19, 1982

[54] FUEL HEATING SYSTEM FOR GAS TURBINE ENGINE

[75] Inventors: Raymond A. Dreisbach, Jr., Old Saybrook; James G. Griffin, West Hartford; Edward F. Cole, Glastonbury, all of Conn.

[73] Assignee: United Technologies Corporation, Hartford, Conn.

[21] Appl. No.: 145,191

[22] Filed: Apr. 29, 1980

[51] Int. Cl.³ .............................................. F02C 7/06
[52] U.S. Cl. .................................... 60/39.08; 60/736
[58] Field of Search ............... 60/736, 39.08, 39.28 R, 60/243

[56] References Cited
U.S. PATENT DOCUMENTS

| | | | |
|---|---|---|---|
| 2,865,580 | 12/1958 | Marshall | 60/39.08 |
| 3,080,716 | 3/1963 | Cummings et al. | 60/736 |
| 3,300,965 | 1/1967 | Sherlaw et al. | 60/39.08 |
| 3,779,007 | 12/1973 | Lavash | 60/243 |
| 4,041,697 | 8/1977 | Coffinberry et al. | 60/736 |
| 4,104,873 | 8/1978 | Coffinberry | 60/736 |

FOREIGN PATENT DOCUMENTS 763449 12/1956 United Kingdom .................. 60/736

*Primary Examiner*—Robert E. Garrett
*Attorney, Agent, or Firm*—Norman Friedland

[57] ABSTRACT

To accommodate fuel having higher freezing points the continuous bypass flow of fuel from the fuel control is selectively diverted to pick up the rejected heat from the engine's lubrication system to heat the fuel in the aircraft fuel tank.

4 Claims, 1 Drawing Figure

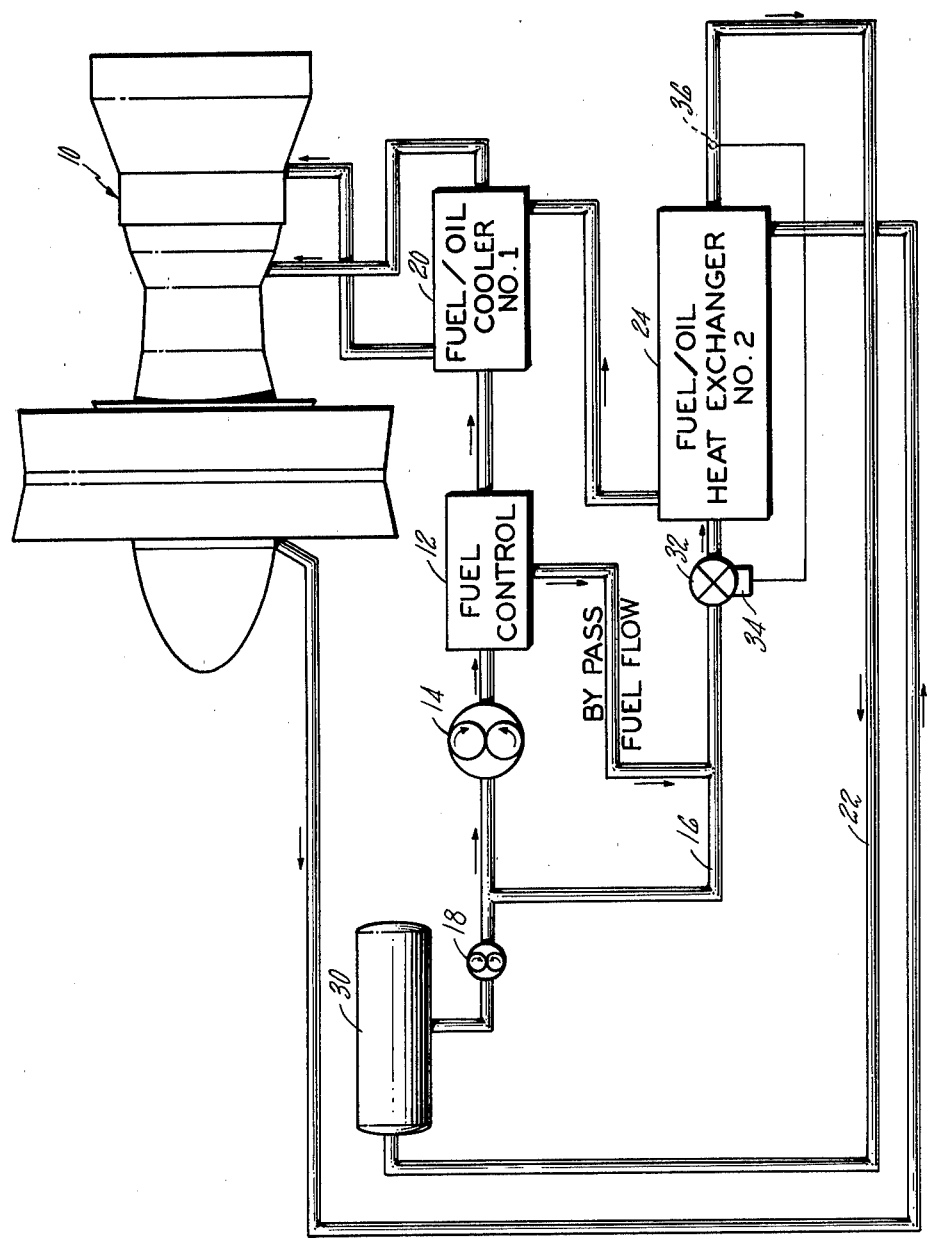

FUEL HEATING SYSTEM FOR GAS TURBINE ENGINE

The Government has rights in this invention pursuant to Contract No. NAS3-20815 awarded by the Department of the National Aeronautics and Space Administration.

DESCRIPTION

1. Technical Field

This invention relates to a fual heating system for a gas turbine engine and particularly to a system that combines the fuel control and engine oil cooling systems.

2. Background Art

Because of the high costs of fuel for aircraft use there is a desire in the industry to utilize a fuel that has been less expensively processed. That is the cracking temperature is reduced resulting in a fuel that freezes and congeals at a higher temperature. Obviously, the flow of fuel owing to the new viscosity characteristics, will be altered such that it could impair the operations of the engine with a consequence on the operation of the aircraft. Hence, as a necessity, it becomes important to heat the fuel to decrease its viscosity for proper engine operation.

We have found that we can combine the existing fuel controls and add a heat exchanger to the existing lubricating oil cooling system to avoid the viscosity problems associated with the higher freezing point fuels.

This invention contemplates utilizing fuel control bypass fuel and selectively diverting the bypass fuel flow to a heat exchanger mounted in series with the normal lubricating system heat exchanger to heat the fuel in the fuel tank. This system allows the utilization of fuel and the rejected engine heat to heat the fuel tank fuel without imposing perturbations that would otherwise occur during the switching on and off of the heat exchanger. Furthermore the system would be less costly and lighter than heretofore known techniques as for example electric heaters.

DISCLOSURE OF THE INVENTION

An object of the invention is to provide for aircraft use an improved fuel heating system which allows use of fuel exhibiting higher freezing points than have been used heretofore.

A feature of the invention is a fuel heating system that capitalizes on the use of the existing fuel bypass system of the fuel control.

Other features and advantages will be apparent from the specification and claims and from the accompanying drawings which illustrate an embodiment of this invention.

BRIEF DESCRIPTION OF THE DRAWING

The sole FIGURE is a schematic view illustrating the invention.

BEST MODE FOR CARRYING OUT THE INVENTION

Referring to the sole FIGURE, a typical gas turbine engine generally illustrated by reference numeral 10 carries a fuel control 12 that meters fuel to the gas turbine combustor. A suitable fuel control, for example, is the JFC-12, JFC-25, JFC-60, and the like manufactured by the Hamilton Standard Division of United Technologies Corporation, the assignee of this application, all of which provide a pressure regulator (not shown) that accepts from the pump 14 more fuel than is required for engine operation and bypasses the unused portion back to the pump. To assure that the engine is never starved, there is always return fuel flow in the bypass line throughout the entire engine operating envelope. Typically, the fuel is delivered to fuel control 12 from tank 30 via lines 11, boost pump 18, line 13, main pump 14, and line 17 and is returned to the inlet of the main fuel pump 14 by conduit 15 and 16 which is located downstream of a suitable booster pump 18.

Also, it is typical to cool the engine lubrication oil in a suitable oil/fuel cooler generally illustrated by reference numeral 20 by placing fuel via line 19 from the fuel control 12 in indirect heat exchange relationship with the heated lubricant before it is admitted into the engine via line 21. As noted, engine oil is returned from the engine via line 22 where it flows through heat exchanger 20 before being readmitted to the engine.

What has been described above constitutes existing apparatus that is well known in the aircraft engine technology. In accordance with this invention a second heat exchanger 24 is placed in series with heat exchanger 20 so that oil from the engine first passes therethrough prior to being readmitted into the engine via the heat exchanger 20. In this manner, oil from the engine is fed to heat exchanger 24 via line 25 into heat exchanger 20 via line 27 and back to the engine via line 22. The bypass fuel from fuel control 12 can be directed to heat exchanger 24 via lines 15 and 16 where it is in indirect heat exchange relation with the engine heated lubrication oil, so as to pick up the engine's rejected heat and then returned to the aircraft fuel tank generally illustrated by reference numeral 30, via line 31.

In this arrangement to the fuel tank heating system, the fuel control pressure regulator is not affected by switching the bypass fuel to heat exchanger 24 inasmuch as the bypass line is always opened to the inlet pressure of pump 14. To have disconnected the bypass line from this inlet would create perturbations which could affect the operation of the fuel control's regulating valve.

Bypass fuel is admitted to heat exchanger 24 by selector valve 32 which may take the form of any (commercially available) suitable on-off valve and routed back to the tank 30. The valve may be made to operate as a function of the temperature of the fuel, or a manual selector, depending on the particular operation desired. As schematically shown, the valve 32 controlled by actuator 34 responds to the temperature in the fuel discharge line sensed by temperature sensor 36.

The heat exchangers 20 and 24 would incorporate thermostatically operated bypass provisions which are commercially available and already exist in the lubricating oil cooling system and operate to maintain the temperature of the oil above 200° F. Lubrication cooling systems employing heat exchangers with thermostatic bypass are used on the JT9D engines manufactured by Pratt and Whitney Aircraft Group of United Technologies Corporation, the assignee of this patent application.

As is apparent from the foregoing, the disclosed system by virtue of its use of the fuel bypassed from the fuel control in combination with the oil lubrication cooling system for fuel tank heating permits the metered fuel flow to the engine to remain unperturbed whenever the tank heating mode is actuated. The selector valve 32 permits use of fuel tank heating as required or cut off of the heating system to protect the engine oil system during start-up and ground idle operation until the oil temperature is stabilized at the 200° F. level.

It should be understood that the invention is not limited to the particular embodiments shown and described herein, but that various changes and modifications may be made without departing from the spirit and scope of this novel concept as defined by the following claims.

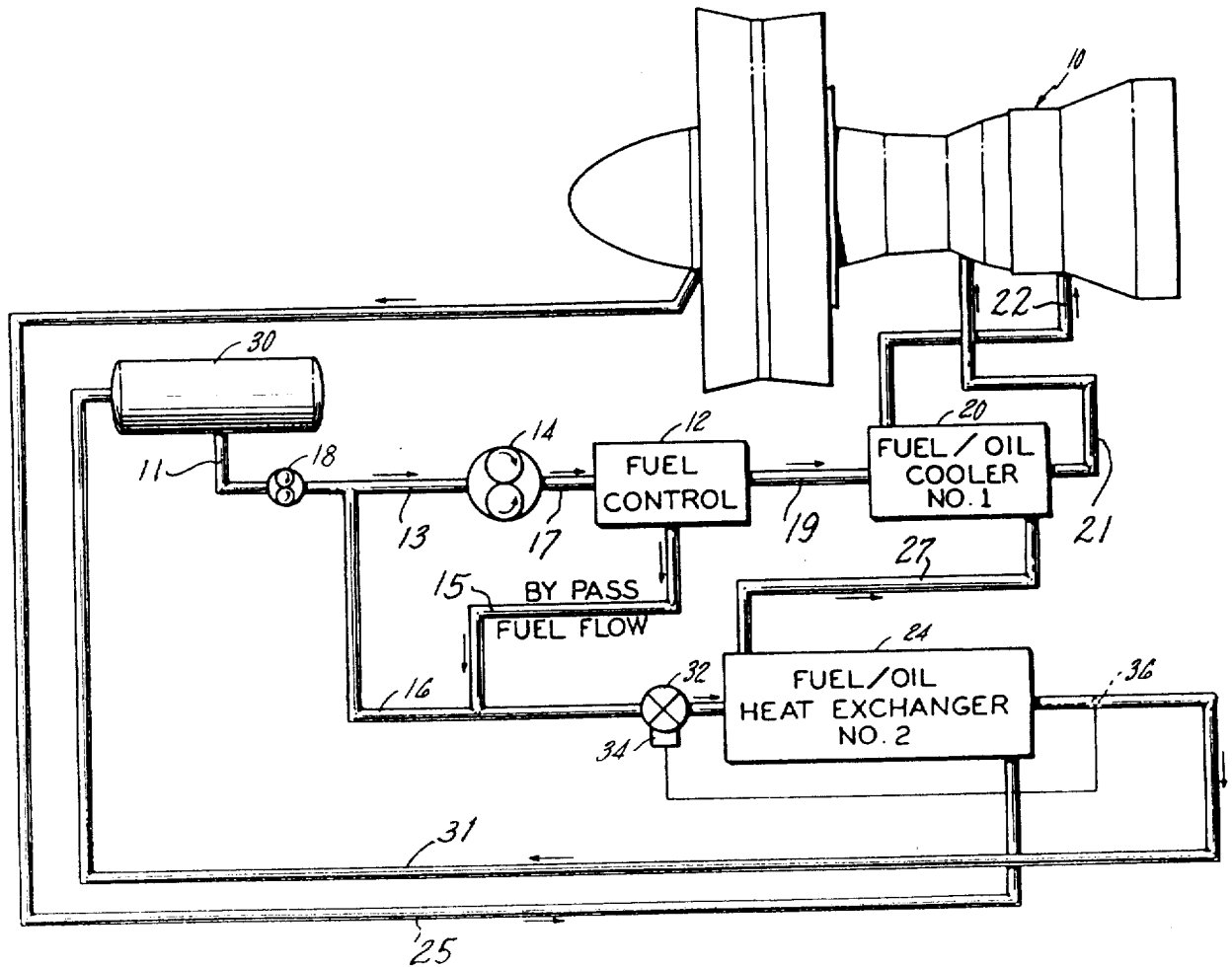

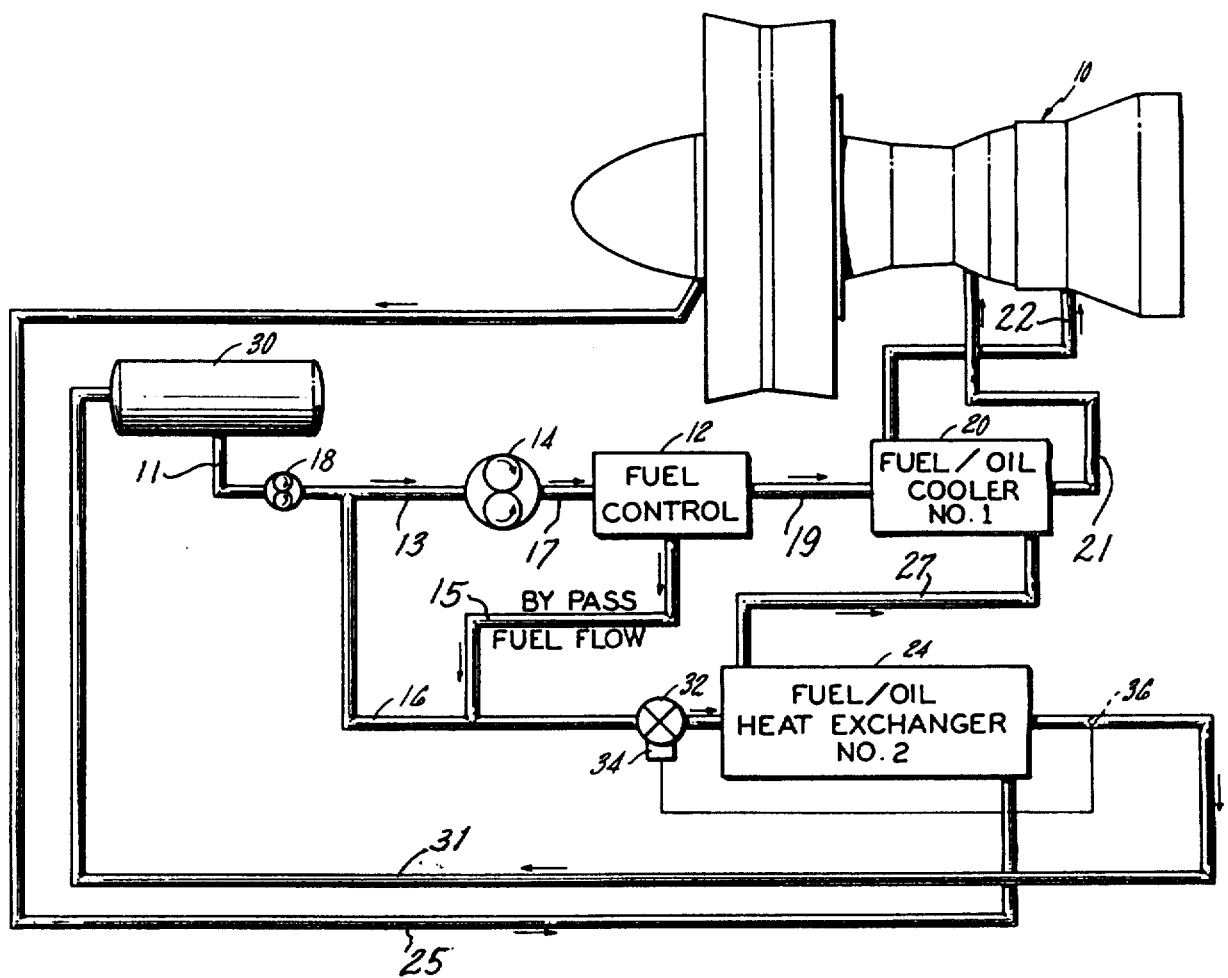

We claim:

1. A system for heating the fuel in a fuel tank for aircraft which system includes a lubrication system for a jet engine, a fuel control that meters fuel to said engine and a heat exchanger that places the fuel and lubricant of said lubrication systems in indirect heat exchange relation, a pump for pressurizing the fuel prior to being admitted to the fuel control which receives an excess of fuel over that being metered to the engine, and a bypass diverting fuel from said engine continuously flowing said excess fuel, said fuel heating system including another heat exchanger having the lubricant connected in series with said heat exchanger, means for interconnecting said excess fuel to said other heat exchanger so as to place said fuel in indirect heat exchange relation with said lubricant, conduit means leading said heated fuel from said other heat exchanger into said fuel tank, means for selectively turning on and off the flow of bypass fuel to said other heat exchanger and said bypass continuously communicating with the inlet of said pump independently of said selective means.

2. A system as in claim 1 including conduit means interconnecting the inlet of said pump and said other heat exchanger with said fuel bypass, selector valve means for shutting the flow of fuel in said conduit means solely to said other heat exchanger.

3. A system as in claim 2 including an actuator positioning said selector valve means to an on and off position, and means responsive to the temperature of the fuel downstream of said other heat exchanger for controlling said actuator means.

4. Means for selectively heating fuel in aircraft fuel tanks in which the aircraft includes an engine powering the aircraft and a lubrication system for said engine, the lubrication system including means for leading lubricant into and out of said engine and a first heat exchanger in indirect heat exchange with the fuel being metered to the engine and said lubricant, a fuel control for metering fuel to said engine which has a continuous flow of excess fuel bypassing said engine, a pump for pressurizing fuel from said fuel tank leading fuel to said fuel control, conduit means continuously conducting said excess fuel to said pump inlet, a second heat exchanger having connection means to the lubrication system and being in series relationship with said first heat exchanger, additional conduit means interconnecting said conduit means and said second heat exchanger, a valve in said additional conduit means for controlling a portion of excess fuel to said second heat exchanger to be in indirect heat exchange relation with said lubricant, means responsive to the temperature of fuel discharging from said second heat exchanger for controlling said valve to selectively admit said portion of excess fuel to said second heat exchanger.

* * * * *

UNITED STATES PATENT AND TRADEMARK OFFICE
CERTIFICATE OF CORRECTION

PATENT NO. : 4,354,345

DATED : October 19, 1982

INVENTOR(S) : Raymond A. Dreisbach, Jr., James G. Griffin & Edward F. Cole

It is certified that error appears in the above-identified patent and that said Letters Patent is hereby corrected as shown below:

Column 1, line 12 "fual" should be --fuel--.

Column 2, line 11 "conduit" should be --conduits--.

Column 2, line 36 "to" should be --of--.

The title page and the figure should appear as shown on the attached sheets.

Signed and Sealed this

Thirteenth Day of September 1983

[SEAL]

Attest:

Attesting Officer

GERALD J. MOSSINGHOFF

Commissioner of Patents and Trademarks

United States Patent [19]

Dreisbach, Jr. et al.

[11] 4,354,345
[45] Oct. 19, 1982

[54] FUEL HEATING SYSTEM FOR GAS TURBINE ENGINE

[75] Inventors: Raymond A. Dreisbach, Jr., Old Saybrook; James G. Griffin, West Hartford; Edward F. Cole, Glastonbury, all of Conn.

[73] Assignee: United Technologies Corporation, Hartford, Conn.

[21] Appl. No.: 145,191

[22] Filed: Apr. 29, 1980

[51] Int. Cl.³ .............................................. F02C 7/06
[52] U.S. Cl. .............................. 60/39.08; 60/736
[58] Field of Search ............... 60/736, 39.08, 39.28 R, 60/243

[56] References Cited

U.S. PATENT DOCUMENTS

| | | | |
|---|---|---|---|
| 2,865,580 | 12/1958 | Marshall | 60/39.08 |
| 3,080,716 | 3/1963 | Cummings et al. | 60/736 |
| 3,300,965 | 1/1967 | Sherlaw et al. | 60/39.08 |
| 3,779,007 | 12/1973 | Lavash | 60/243 |
| 4,041,697 | 8/1977 | Coffinberry et al | 60/736 |
| 4,104,873 | 8/1978 | Coffinberry | 60/736 |

FOREIGN PATENT DOCUMENTS 763449  12/1956  United Kingdom ........... 60/736

*Primary Examiner*—Robert E. Garrett
*Attorney, Agent, or Firm*—Norman Friedland

[57] ABSTRACT

To accommodate fuel having higher freezing points the continuous bypass flow of fuel from the fuel control is selectively diverted to pick up the rejected heat from the engine's lubrication system to heat the fuel in the aircraft fuel tank.

4 Claims, 1 Drawing Figure